(12) United States Patent
Qiao et al.

(10) Patent No.: US 12,720,476 B2
(45) Date of Patent: Aug. 25, 2026

(54) METHOD AND APPARATUS FOR REPORTING LOCATION INFORMATION

(71) Applicant: HUAWEI TECHNOLOGIES CO., LTD., Shenzhen (CN)

(72) Inventors: Yunfei Qiao, Hangzhou (CN); Jun Wang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 258 days.

(21) Appl. No.: 18/756,648

(22) Filed: Jun. 27, 2024

(65) Prior Publication Data

US 2024/0349230 A1 Oct. 17, 2024

Related U.S. Application Data

(63) Continuation of application No. PCT/CN2022/138634, filed on Dec. 13, 2022.

(30) Foreign Application Priority Data

Jan. 11, 2022 (CN) ........................ 202210028208.9

(51) Int. Cl.
*H04W 64/00* (2009.01)
*H04W 52/02* (2009.01)
*H04W 84/06* (2009.01)

(52) U.S. Cl.
CPC ....... *H04W 64/00* (2013.01); *H04W 52/0203* (2013.01); *H04W 84/06* (2013.01)

(58) Field of Classification Search
CPC .. H04W 64/00; H04W 52/0203; H04W 84/06
USPC ........................................................ 455/456.6
See application file for complete search history.

(56) References Cited

U.S. PATENT DOCUMENTS

2006/0094450 A1* 5/2006 Park .................. H04W 52/0225 455/458
2012/0021714 A1* 1/2012 Chen ..................... H04W 68/00 455/458
2017/0188184 A1* 6/2017 Acharya ........... H04W 52/0209
(Continued)

FOREIGN PATENT DOCUMENTS

CN 107645753 A 1/2018
CN 111866970 A 10/2020
(Continued)

*Primary Examiner* — Qutbuddin Ghulamali
(74) *Attorney, Agent, or Firm* — WOMBLE BOND DICKINSON (US) LLP

(57) ABSTRACT

Embodiments of this application provide a method and an apparatus for reporting location information. The method includes a terminal device determines that a trigger condition of a first procedure is satisfied. The first procedure is for determining a location area of the terminal device, and the trigger condition includes at least one of The terminal device switches the location area, a quantity of times that the terminal device switches the location area exceeds a first preset value; the terminal device has displacement, and the displacement exceeds a second preset value, a time interval since the last time the terminal device triggers the first procedure exceeds first time, or, the terminal device enters an idle state or an inactive state. The terminal device triggers the first procedure.

20 Claims, 4 Drawing Sheets

(56) References Cited

U.S. PATENT DOCUMENTS

2017/0238136 A1* 8/2017 Smith ............... H04M 1/72457
455/456.3
2020/0396000 A1* 12/2020 Ryu ...................... H04W 76/25
2022/0015012 A1* 1/2022 Shrestha ............... H04W 48/04
2022/0078746 A1* 3/2022 Lee ..................... H04W 64/003
2022/0141891 A1* 5/2022 Masini ............... H04B 7/18528
370/316

FOREIGN PATENT DOCUMENTS

CN 113179512 A 7/2021
CN 113796102 A 12/2021

* cited by examiner

METHOD AND APPARATUS FOR REPORTING LOCATION INFORMATION

CROSS-REFERENCE TO RELATED APPLICATIONS

This application is a continuation of International Patent Application No. PCT/CN2022/138634, filed on Dec. 13, 2022, which claims priority to Chinese Patent Application No. 202210028208.9, filed on Jan. 11, 2022. The disclosures of the aforementioned applications are hereby incorporated by reference in their entireties.

TECHNICAL FIELD

Embodiments of this application relate to the communication field, and more specifically, to a method and an apparatus for reporting location information.

BACKGROUND

A conventional terrestrial network cannot provide seamless coverage for a terminal device, especially in a place where a base station cannot be deployed, such as the sea, the desert, or the air. Therefore, a non-terrestrial network (NTN) is introduced into a 5th generation (5G) system. The non-terrestrial network provides seamless coverage for the terminal device through deployment of a base station or some base station functions on a high-altitude platform or a satellite. The high-altitude platform or the satellite is less affected by a natural disaster, so that reliability of the 5G system can be improved.

An idea of a tracking area (TA) is proposed in a long term evolution (LTE) system. A registration area, also referred to herein as a TA list, is assigned to the terminal device by using a network, and the TA list of the terminal device may include one or more TAs. When a terminal device is paged, the network side needs to perform paging based on the TA list allocated to the terminal device. The TA is divided into cells. One TA may include one or more cells, but one cell belongs to only one TA. In the NTN system, because a coverage range of a single cell is wide, when the satellite performs paging in an entire TA list range, numerous system resources need to be occupied. In this case, data sending or receiving of another terminal device is affected. Therefore, before paging the terminal device, the network device needs to determine a location area of the terminal device.

SUMMARY

Embodiments of this application provide a communication method and a communication apparatus. When a location of a terminal device changes or the terminal device enters an idle state or an inactive state from an active state, the terminal device communicates with a network device by using a first procedure similar to a random access procedure without exiting the idle state or the inactive state, so that the network device can determine a location area of the terminal device, and update location information of the terminal device. The location information may correspond to a beam/cell/paging area/geographical location, so that in an NTN system, the network device may page the terminal device at a level of the beam/cell/paging area/geographical location, thereby reducing system energy consumption.

According to a first aspect, a method for reporting location information is provided. The method for reporting location information includes: A terminal device determines that a trigger condition of a first procedure is satisfied. The first procedure is used by a network device to determine a location area of the terminal device, and the trigger condition includes at least one of the following:

The terminal device switches the location area.

A quantity of times that the terminal device switches the location area exceeds a first preset value.

The terminal device has displacement, and the displacement exceeds a second preset value.

A time interval since the last time the terminal device triggers the first procedure exceeds first time.

The terminal device enters an idle state or an inactive state.

The terminal device triggers the first procedure.

According to the method provided in embodiments of this application, the network device can determine the location area of the terminal device by performing the first procedure, and update location information of the terminal device in a case in which the terminal device does not exit the idle state. The location information may correspond to a beam/cell/paging area/geographical location, so that in an NTN system, the network device may page the terminal device at a level of the beam/cell/paging area/geographical location, thereby reducing system energy consumption.

In embodiments, the location area may be a coverage range of a logical cell.

In embodiments, the location area may be a coverage range of a physical cell.

In embodiments, the location area may be a coverage range of a satellite beam.

With reference to the first aspect, in some embodiments of the first aspect, the first procedure is similar to a four-operation random access procedure, and the first procedure may be as follows:

The terminal device sends a first preamble sequence to the network device.

The terminal device receives resource configuration information of the network device. The resource configuration information is for configuring a first resource.

The terminal device sends first information to the network device over the first resource. The first information includes a first identifier, and the first identifier is for identifying the terminal device.

The terminal device receives first indication information of the network device. The first indication information indicates the terminal device to remain in the idle state or the inactive state.

In embodiments, the first procedure may include only the first operation, or the first procedure may include only the first three operations. If the terminal device does not receive the first indication information, the terminal device may remain in the idle state or the inactive state by default.

In embodiments, the first preamble sequence indicates that the first procedure is for determining the location area of the terminal device. In embodiments, the first identifier may be any one of the following:

- an international mobile subscriber identity (IMSI);
- a system architecture evolved temporary mobile subscriber identity (S-TMSI);
- a 5G system architecture evolved temporary mobile subscriber identity (5G-S-TMSI); and
- an inactive radio network temporary identifier (I-RNTI).

In embodiments, the first information may further include at least one of the following:

- a trigger reason of the first procedure, where the trigger reason includes that the trigger condition of the first procedure is triggered;

a camping beam of the terminal device;
a camping cell of the terminal device;
a camping paging area identifier of the terminal device; or
a geographical location identifier of the terminal device.

With reference to the first aspect, in some embodiments of the first aspect, the first procedure is similar to a two-operation random access procedure, and the first procedure may be as follows:

The terminal device sends second information to the network device. The second information includes a second preamble sequence and a second identifier, and the second identifier is for identifying the terminal device.

The terminal device receives second indication information of the network device. The second indication information indicates the terminal device to remain in the idle state or the inactive state.

In embodiments, the first procedure may include only the first operation. Correspondingly, if the terminal device does not receive the second indication information, the terminal device remains in the idle state or the inactive state by default.

In embodiments, the second preamble sequence indicates that the first procedure is for determining the location area of the terminal device.

It should be understood that the network device determines the location area of the terminal device by using a beam or a channel used by the terminal device to send the first preamble sequence or the second preamble sequence in the first procedure. It should be noted that through the first procedure, the terminal device in the idle state or the inactive state can communicate with the network device without accessing the network device, so that the network device obtains the location area of the terminal device.

In embodiments, the second identifier may be any one of the following:

an international mobile subscriber identity (IMSI);
a system architecture evolved temporary mobile subscriber identity (S-TMSI);
a 5G system architecture evolved temporary mobile subscriber identity (5G-S-TMSI); and
an inactive radio network temporary identifier (I-RNTI).

In embodiments, the second information may further include at least one of the following:

a trigger reason of the first procedure, where the trigger reason includes that the trigger condition of the first procedure is triggered;
a camping beam of the terminal device;
a camping cell of the terminal device;
a camping paging area identifier of the terminal device; or
a geographical location identifier of the terminal device.

With reference to the first aspect, in some embodiments of the first aspect, the method further includes: The terminal device receives configuration information of the network device. The configuration information is for configuring the trigger condition of the first procedure.

According to a second aspect, a method for reporting location information is provided. The method for reporting location information includes: A network device determines a location area of a terminal device based on a first procedure. The first procedure is triggered after the terminal device determines that a trigger condition of the first procedure is satisfied, and the trigger condition of the first procedure includes at least one of the following:

The terminal device switches the location area.

A quantity of times that the terminal device switches the location area exceeds a first preset value.

The terminal device has displacement, and the displacement exceeds a second preset value.

A time interval since the last time the terminal device triggers the first procedure exceeds first time.

The terminal device enters an idle state or an inactive state.

The network device updates the location area of the terminal device.

According to the method provided in embodiments of this application, the network device can determine the location area of the terminal device by performing the first procedure, and update the location area of the terminal device in a case in which the terminal device does not exit the idle state. The location area may correspond to a beam/cell/paging area/geographical location, so that in an NTN system, the network device may page the terminal device at a level of the beam/cell/paging area/geographical location, thereby reducing system energy consumption.

In embodiments, the location area may be a coverage range of a logical cell.

In embodiments, the location area may be a coverage range of a physical cell.

In embodiments, the location area may be a coverage range of a satellite beam.

With reference to the second aspect, in some embodiments of the second aspect, the first procedure is similar to a four-operation random access procedure, and the first procedure may be as follows:

The network device receives a first preamble sequence sent by the terminal device.

The network device sends resource configuration information to the terminal device. The resource configuration information is for configuring a first resource.

The network device receives first information sent by the terminal device over the first resource. The first information includes a first identifier, and the first identifier is for identifying the terminal device.

The network device sends first indication information to the terminal device. The first indication information indicates the terminal device to remain in the idle state or the inactive state.

In embodiments, the first preamble sequence indicates that the first procedure is for determining the location area of the terminal device.

In embodiments, the first identifier may be any one of the following:

an international mobile subscriber identity (IMSI);
a system architecture evolved temporary mobile subscriber identity (S-TMSI);
a 5G system architecture evolved temporary mobile subscriber identity (5G-S-TMSI); and
an inactive radio network temporary identifier (I-RNTI).

In embodiments, the first information may further include at least one of the following:

a trigger reason of the first procedure, where the trigger reason includes that the trigger condition of the first procedure is triggered;
a camping beam of the terminal device;
a camping cell of the terminal device;
a camping paging area identifier of the terminal device; or
a geographical location identifier of the terminal device.

With reference to the second aspect, in some embodiments of the second aspect, the first procedure is similar to a two-operation random access procedure, and the first procedure may be as follows:

The network device receives second information sent by the terminal device. The second information includes a second preamble sequence and a second identifier, and the second identifier is for identifying the terminal device.

The network device sends second indication information to the terminal device. The second indication information indicates the terminal device to remain in the idle state or the inactive state.

In embodiments, the second preamble sequence indicates that the first procedure is for determining the location area of the terminal device.

In embodiments, the second identifier may be any one of the following:

an international mobile subscriber identity (IMSI);

a system architecture evolved temporary mobile subscriber identity (S-TMSI);

a 5G system architecture evolved temporary mobile subscriber identity (5G-S-TMSI); and an inactive radio network temporary identifier (I-RNTI).

In embodiments, the second information may further include at least one of the following:

a trigger reason of the first procedure, where the trigger reason includes that the trigger condition of the first procedure is triggered;

a camping beam of the terminal device;

a camping cell of the terminal device;

a camping paging area identifier of the terminal device; or a geographical location identifier of the terminal device.

With reference to the second aspect, in some embodiments of the second aspect, the method further includes: The network device sends configuration information to the terminal device. The configuration information is for configuring the trigger condition of the first procedure.

According to a third aspect, a paging method is provided. The paging method includes: A terminal device receives a paging message sent by a network device. The paging message includes random access information, the random access information includes an identifier of the terminal device, a preamble sequence used by the terminal device for random access, and a first resource used by the terminal device to complete random access, and the first resource includes a time-frequency resource and a polarization direction. The terminal device completes random access based on the random access information.

According to the method provided in embodiments of this application, the network device includes, in the paging message, information such as an identifier of the terminal device, the preamble sequence, the time-frequency resource, and the polarization direction that are related to random access, so that when receiving the paging message, the terminal device obtains information required for subsequent random access, and the terminal device can complete the random access with the network device in a contention-free random access manner, thereby saving time and improving random access efficiency.

According to a fourth aspect, a paging method is provided. The paging method includes: A network device sends a paging message to a terminal device. The paging message includes random access information. The random access information includes an identifier of the terminal device, a preamble sequence used by the terminal device for random access, and a first resource used by the terminal device to complete random access. The first resource includes a time-frequency resource and a polarization direction.

According to the method provided in embodiments of this application, the network device includes, in the paging message, information such as an identifier of the terminal device, the preamble sequence, the time-frequency resource, and the polarization direction that are related to random access, so that when receiving the paging message, the terminal device obtains information required for subsequent random access, and the terminal device can complete the random access with the network device in a contention-free random access manner, thereby saving time and improving random access efficiency.

According to a fifth aspect, a communication apparatus is provided. The communication apparatus includes units configured to perform the operations of the communication method in either the first aspect or the third aspect, or any one of the embodiments of the first aspect or the third aspect.

In a design, the communication apparatus is a communication chip. The communication chip may include an input circuit or an interface configured to send information or data, and an output circuit or an interface configured to receive information or data.

In another design, the communication apparatus is a communication device (for example, a terminal device), and the communication chip may include a transmitter configured to send information and a receiver configured to receive information or data.

According to a sixth aspect, a communication apparatus is provided. The communication apparatus includes units configured to perform the operations of the communication method in either the second aspect or the fourth aspect, or any one of the embodiments of the second aspect or the fourth aspect.

In a design, the communication apparatus is a communication chip. The communication chip may include an input circuit or an interface configured to send information or data, and an output circuit or an interface configured to receive information or data.

In another design, the communication apparatus is a communication device (for example, a network device), and the communication chip may include a transmitter configured to send information and a receiver configured to receive information or data.

According to a seventh aspect, a communication device is provided. The communication device includes a processor and a memory. The memory is configured to store a computer program. The processor is configured to call the computer program from the memory and run the computer program, to enable the communication device to perform the communication method in either the first aspect to the fourth aspect, or any one of the embodiments of the first aspect to the fourth aspect.

In embodiments, there are one or more processors, and there are one or more memories.

In embodiments, the memory may be integrated with the processor, or the memory and the processor are separately disposed.

In embodiments, the communication device further includes a transmitter and a receiver.

According to an eighth aspect, a computer program product is provided. The computer program product includes a computer program (which may also be referred to as code or instructions). When the computer program is run, a computer is enabled to perform the communication method in any one of the first aspect to the fourth aspect or any one of the embodiments of the first aspect to the fourth aspect.

According to a ninth aspect, a computer-readable medium is provided. The computer-readable medium stores a computer program (which may also be referred to as code or instructions). When the computer program is run on a computer, the computer is enabled to perform the communication method in any one of the first aspect to the fourth aspect or any one of the embodiments of the first aspect to the fourth aspect.

According to a tenth aspect, a chip system is provided. The chip system includes a memory and a processor. The memory is configured to store a computer program. The processor is configured to call the computer program from the memory and run the computer program, so that a communication device with the chip system installed performs the communication method in either the first aspect or the second aspect, or any one of the embodiments of the first aspect or the second aspect. The chip system may include an input circuit or an interface configured to send information or data, and an output circuit or an interface configured to receive information or data.

DESCRIPTION OF EMBODIMENTS

The following describes technical solutions of embodiments in this application with reference to accompanying drawings.

The technical solutions of embodiments of this application may be applied in various communication systems, for example, a global system for mobile communications (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a 5G system, or a new radio (NR) system. A terminal device in embodiments of this application may also be referred to as user equipment, an access terminal, a subscriber unit, a subscriber station, a mobile station, a remote station, a remote terminal, a mobile device, a user terminal, a terminal, a wireless communication device, a user agent, a user apparatus, or the like. The terminal device may alternatively be a cellular phone, a cordless phone, a session initiation protocol (SIP) phone, a wireless local loop (WLL) station, a personal digital assistant (PDA), a handheld device with a wireless communication function, a computing device, another processing device connected to a wireless modem, a vehicle-mounted device, a wearable device, a terminal device in a 5G network, a terminal device in an evolved public land mobile network (PLMN), or the like. This is not limited in embodiments of this application.

A network device in embodiments of this application may be a device configured to communicate with the terminal device. The network device may be a base transceiver station (BTS) in the GSM or the CDMA system, a NodeB (NB) in the WCDMA system, an evolved NodeB (eNB or eNodeB) in the LTE system, or a radio controller in a cloud radio access network (CRAN) scenario. Alternatively, the network device may be a relay station, an access point, a vehicle-mounted device, a wearable device, a network device in a 5G network, a network device in an evolved PLMN network, or the like. This is not limited in embodiments of this application.

The method provided in embodiments of this application is mainly applied to satellite communication in an NTN system. However, the method in embodiments of this application can also be used into a terrestrial system. This is not limited in embodiments of this application.

Figure 1:
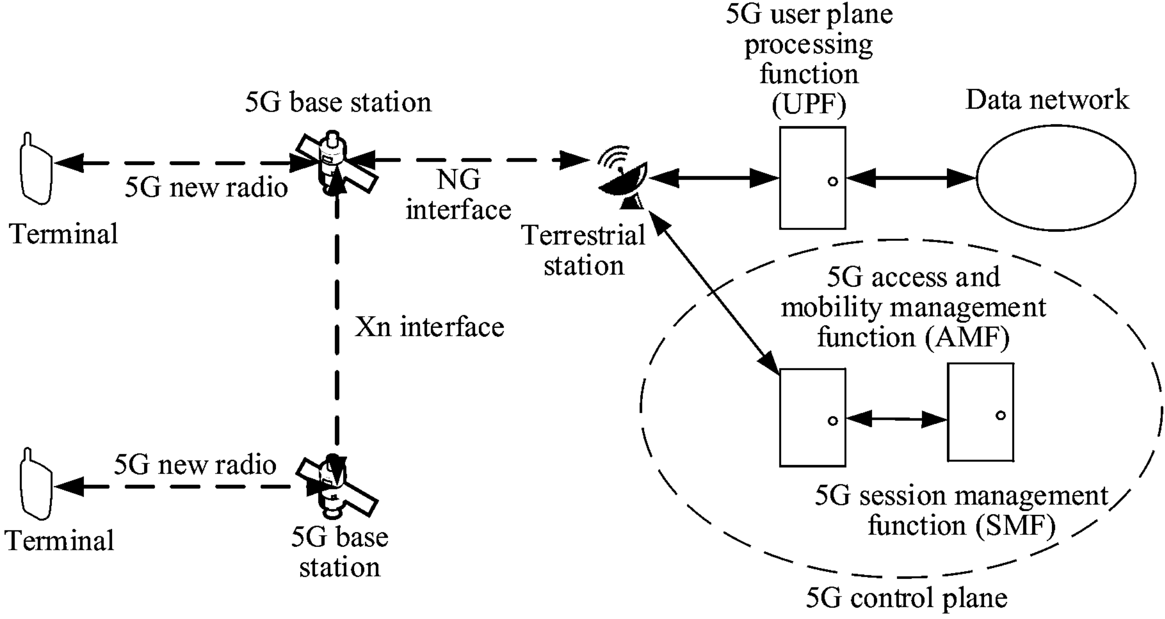
FIG. 1 is a diagram of a system architecture according to an embodiment of this application.

FIG. 1 is a diagram of a system architecture according to an embodiment of this application. FIG. 1 shows a system architecture obtained through integration of satellite communication and a 5G technology. A terrestrial terminal device accesses a network through 5G new radio. A 5G station is deployed on a satellite, and is connected to a terrestrial core network through a radio link. In addition, there is a radio link between satellites, to complete signaling exchange between base stations and data transmission of the terminal device. Network elements and interfaces of the network elements in FIG. 1 are described as follows:

A terminal device is a mobile device that supports the 5G new radio, and is typically a mobile device such as a smartphone and a pad. The terminal device may access a satellite network through an air interface and initiate a service such as a call or Internet access.

A 5G base station is a base station mainly provides a wireless access service, schedules radio resources for an access terminal device, and provides a reliable wireless transmission protocol and data encryption protocol, and the like.

A 5G core network provides services such as user access control, mobility management, session management, user security authentication, and accounting. The 5G core network includes a plurality of functional units, which can be classified into control-plane functional entities and data-plane functional entities. An access and mobility management function (AMF) is responsible for user access management, security authentication, and mobility management. A user plane function (UPF) is responsible for managing functions such as user plane data transmission, traffic statistics collection, and security eavesdropping.

A terrestrial station is responsible for forwarding signaling and service data between a satellite base station and a 5G core network.

A 5G new radio is a radio link between a terminal device and a base station.

An Xn interface is an interface between a 5G base station and a base station, and is for signaling exchange such as handover.

An NG interface is an interface between a 5G base station and a 5G core network, and is for exchanging signaling such as NAS of the core network and service data of users.

Figure 2:
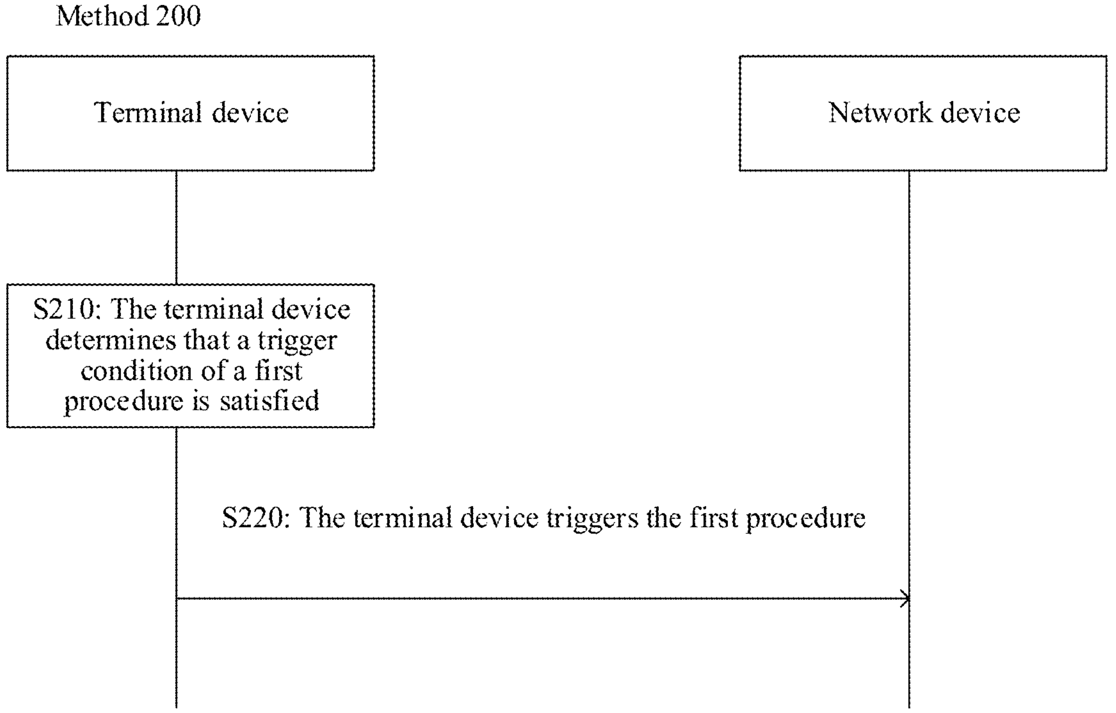
FIG. 2 is a diagram of an example of a method for reporting location information according to an embodiment of this application.

FIG. 2 is an example of a method for reporting location information according to an embodiment of this application. It should be understood that the method may be applied to an NTN system, or may be applied to a terrestrial system. This is not limited in this embodiment of this application.

It should be understood that in the method, location area information of a terminal device is reported by triggering a first procedure.

As shown in the figure, the method 200 includes the following operations.

S210: The terminal device determines that a trigger condition of the first procedure is satisfied.

In embodiments, the trigger condition of the first procedure is preconfigured by a network device for the terminal device.

In embodiments, before operation S210, the network device sends configuration information to the terminal device. The configuration information is for configuring the trigger condition of the first procedure.

It should be noted that before operation S210, the network device may deliver a configuration of the first procedure. The configuration may include a configuration of a preamble sequence, or may include a configuration of a supported maximum data size.

The first procedure is for determining the location area of the terminal device.

The trigger condition includes at least one of the following:

The terminal device switches the location area.

A quantity of times that the terminal device switches the location area exceeds a first preset value.

The terminal device has displacement, and the displacement exceeds a second preset value.

A time interval since the last time the terminal device triggers the first procedure exceeds first time.

The terminal device enters an idle state or an inactive state. In embodiments, the terminal device enters the idle state or the inactive state from a connected state.

In embodiments, the location area of the terminal device may be a coverage range of a logical cell in which the terminal device is located.

In embodiments, the location area of the terminal device may be a coverage range of a physical cell in which the terminal device is located.

In embodiments, the location area of the terminal device may be a coverage range of a satellite beam corresponding to the terminal device.

In embodiments, that the terminal device switches the location area may be that the terminal device moves from a coverage range of one logical cell to a coverage range of another logical cell.

In embodiments, that the terminal device switches the location area may be that the terminal device moves from a coverage range of one physical cell to a coverage range of another physical cell.

In embodiments, that the terminal device switches the location area may be that the terminal device moves from a coverage range of one satellite beam to a coverage range of another satellite beam.

The following describes how to determine the location area of the terminal device by performing the first procedure.

In embodiments, the first procedure may be similar to a operation of four-operation random access. The operations of the first procedure may include:

1. The terminal device sends a first preamble sequence to the network device.

Correspondingly, the network device receives the first preamble sequence sent by the terminal device.

The terminal device may send the first preamble sequence to the network device in a cell or a beam on which the terminal device currently camps.

In embodiments, a process in which the terminal device sends the first preamble sequence to the network device may be a contention process.

In embodiments, a process in which the terminal device sends the first preamble sequence to the network device may be a non-contention process.

In embodiments, the first preamble sequence may indicate that the first procedure is for determining the location area of the terminal device.

It should be understood that operations of the first procedure may be the same as operations of reusing early data transmission (EDT) of the four-operation random access procedure. Therefore, a specific first preamble sequence is configured to indicate that the first procedure is triggered for determining the location area of the terminal device, or indicate that the first procedure is triggered because the trigger condition of the first procedure is satisfied.

The terminal device may send the first preamble sequence to a radio access network (RAN) network element in the network device.

2. The network device sends resource configuration information to the terminal device.

Correspondingly, the terminal device receives the resource configuration information sent by the network device.

The resource configuration information is for configuring a first resource.

The network device receives the first preamble sequence, and allocates, to the terminal device, the first resource required for sending information in operation 3, and the network device sends the resource configuration information to the terminal device to configure the first resource for the terminal device.

3. The terminal device sends first information to the network device over the first resource. The first information includes a first identifier.

Correspondingly, the network device receives the first information over the first resource.

The first identifier is for identifying the terminal device.

In embodiments, the first identifier may be an international mobile subscriber identity (IMSI).

In embodiments, the first identifier may be a temporary mobile subscriber identity (such as a System Architecture Evolution Temporary Mobile Station Identity (S-TMSI)).

In embodiments, the first identifier may be a 5G system architecture evolved temporary mobile subscriber identity (5G-S-TMSI).

In embodiments, the first identifier may be an inactive radio network temporary identifier (I-RNTI).

In embodiments, the first information further includes a trigger reason of triggering the first procedure. In embodiments, the trigger reason may be that any one of the foregoing trigger conditions of the first procedure is triggered.

In embodiments, the first information further includes camping beam information of the terminal device.

In embodiments, the first information further includes a camping paging area identifier of the terminal device.

In embodiments, the first information further includes a geographical location identifier of the terminal device. The geographical location identifier may be longitude and latitude coordinates of the terminal device, or may be a city in which the terminal device is located, or the like.

It should be understood that the network device may determine the location area of the terminal device based on the camping beam information, the camping paging area identifier, the geographical location identifier, and the like. The first information may not include the foregoing identifiers, and the network device may determine the location area of the terminal device by using a process of the first procedure.

4. The network device sends first indication information to the terminal device. The first indication information indicates the terminal device to remain in an idle state or an inactive state.

Correspondingly, the terminal device receives the first indication information of the network device.

It should be noted that, this operation is optional, or the terminal device may remain in the idle state or the inactive state after initiating, by default, the first procedure for determining the location area of the terminal device.

In embodiments, operations of the first procedure are similar to a operation of two-operation random access, and the first procedure may include:

1. The terminal device sends second information to the network device. The second information includes a second preamble sequence and a second identifier.

Correspondingly, the network device receives the second information.

The terminal device may send the second preamble sequence to the network device in a cell or a beam on which the terminal device currently camps.

In embodiments, a process in which the terminal device sends the second preamble sequence to the network device may be a contention process.

In embodiments, a process in which the terminal device sends the second preamble sequence to the network device may be a non-contention process.

In embodiments, the second preamble sequence may indicate that the first procedure is for determining the location area of the terminal device.

It should be understood that the operations of the first procedure may be the same as operations of reusing the EDT of the two-operation random access procedure. Therefore, a specific second preamble sequence is configured to indicate that the first procedure is triggered for determining the location area of the terminal device, or indicate that the first procedure is triggered because the trigger condition of the first procedure is satisfied.

The terminal device may send the second preamble sequence to a RAN network element in the network device.

The second identifier is for identifying the terminal device.

In embodiments, the second identifier may be an IMSI.

In embodiments, the second identifier may be an S-TMSI.

In embodiments, the second identifier may be a 5G-S-TMSI.

In embodiments, the second identifier may be an I-RNTI.

In embodiments, the second information further includes a trigger reason of triggering the first procedure. In embodiments, the trigger reason may be that any one of the foregoing trigger conditions of the first procedure is triggered.

In embodiments, the second information further includes camping beam information of the terminal device.

In embodiments, the second information further includes a camping paging area identifier of the terminal device.

In embodiments, the second information further includes a geographical location identifier of the terminal device. The geographical location identifier may be longitude and latitude coordinates of the terminal device, or may be a city in which the terminal device is located, or the like.

It should be understood that the network device may determine the location area of the terminal device based on the camping beam information, the camping paging area identifier, the geographical location identifier, and the like. The second information may not include the foregoing identifiers, and the network device may determine the location area of the terminal device by using a process of the first procedure.

2. The network device sends second indication information to the terminal device. The second indication information indicates the terminal device to remain in an idle state or an inactive state.

Correspondingly, the terminal device receives the second indication information of the network device.

It should be noted that, this operation is optional, or the terminal device may remain in the idle state or the inactive state after initiating, by default, the first procedure for determining the location area of the terminal device.

S220: The terminal device triggers the first procedure.

Correspondingly, the network device determines the location area of the terminal device based on the first procedure.

Further, the network device updates location information of the terminal device (for example, a camping beam of the terminal device corresponding to the location area of the terminal device, a camping cell of the terminal device, a paging area of the terminal device, and a geographical location of the terminal device) based on the location area determined in the first procedure, and pages the terminal device at a new location.

Further, after the network device fails to page the terminal device at the new location, the network device may extend a paging range to an entire tracking area.

According to the method provided in this embodiment of this application, when a location of the terminal device changes or the terminal device enters the idle state or the inactive state from an active state, the terminal device communicates with the network device by performing the first procedure similar to a random access procedure without exiting the idle state or the inactive state, so that the network device can determine the location area of the terminal device and update location information of the terminal device. In an NTN system, the network device may page the terminal device at a level of a beam/cell/paging area/geographical location, thereby reducing system energy consumption.

Figure 3:
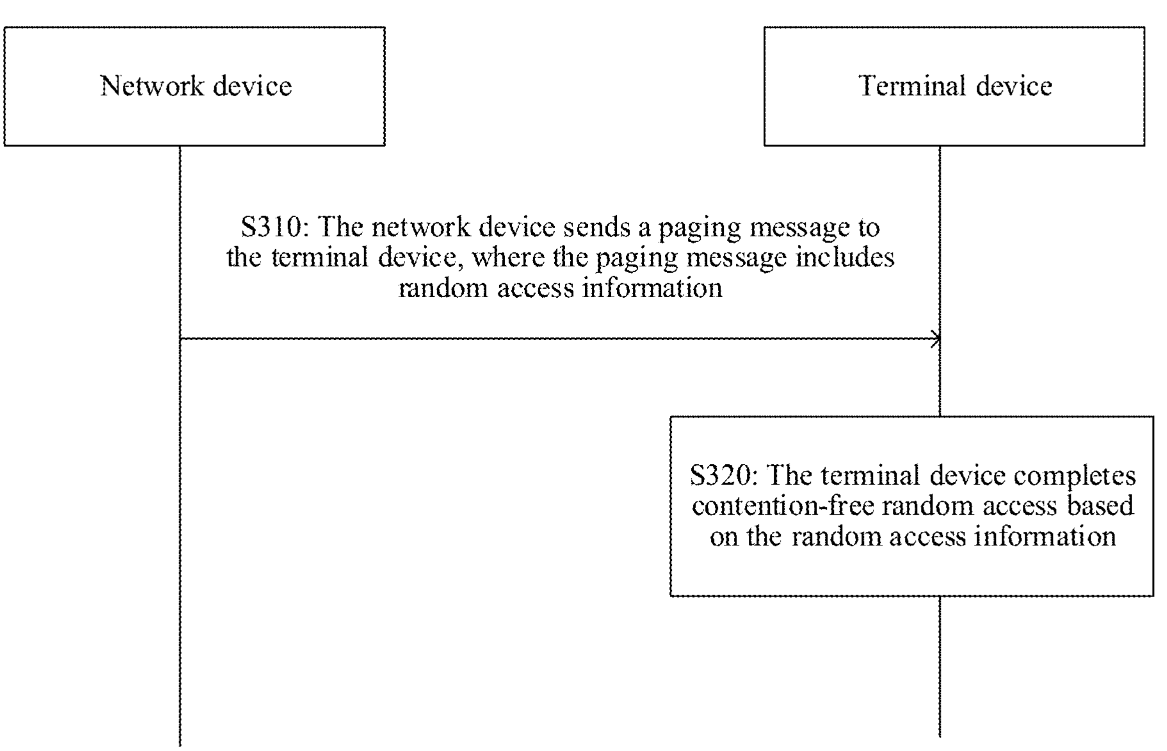
FIG. 3 is a diagram of an example of a paging method according to an embodiment of this application.

FIG. 3 is an example of a paging method according to an embodiment of this application. As shown in FIG. 3, the method 300 includes the following operations.

S310: A network device sends a paging message to a terminal device, where the paging message includes random access information.

Correspondingly, the terminal device receives the paging message sent by the network device.

The random access information is a newly added field in a paging field of an RRC message.

The random access information is related information used by the terminal device to complete a random access procedure. The random access information includes an identifier of the terminal device, a preamble sequence used by the terminal device for random access, and a first resource used by the terminal device to complete random access. The first resource includes a time-frequency resource and a polarization direction.

S320: The terminal device completes contention-free random access based on the random access information.

According to the method provided in this embodiment of this application, the network device includes, in the paging message, information such as the identifier of the terminal device, the preamble sequence, the time-frequency resource, and the polarization direction that are related to random access, so that when receiving the paging message, the terminal device obtains information required for subsequent random access, and the terminal device can complete the random access with the network device in a contention-free random access manner, thereby saving time and improving random access efficiency.

Figure 4:
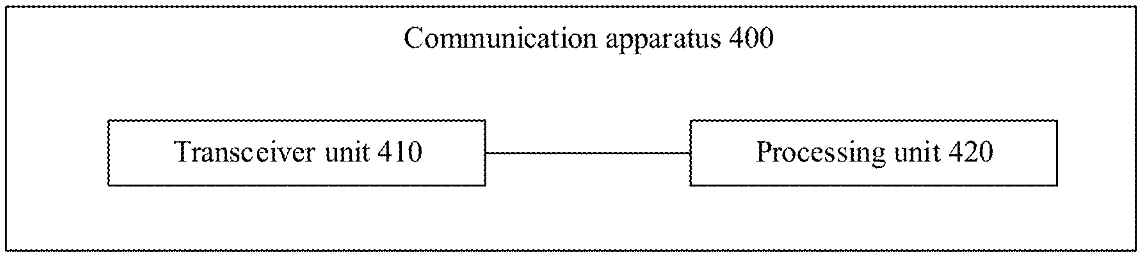
FIG. 4 is a diagram of an example of a communication apparatus according to an embodiment of this application.

FIG. 4 is a diagram of an example of a communication apparatus according to an embodiment of this application. As shown in FIG. 4, the communication apparatus 400 includes a transceiver unit 410 and a processing unit 420.

In some embodiments, the communication apparatus 400 may be configured to achieve a function of the terminal device in any one of the foregoing methods. For example, the communication apparatus 400 may correspond to a terminal device.

The communication apparatus 400 may be a terminal device, and performs the operations performed by the terminal device in the foregoing method embodiments. The transceiver unit 410 may be configured to support the communication apparatus 400 in performing communication, for example, performing sending and/or receiving actions performed by the terminal device in the foregoing method embodiments. The processing unit 420 may be configured to support the communication apparatus 400 in performing processing actions in the foregoing method embodiments, for example, performing processing actions performed by the terminal device in the foregoing method embodiments.

In embodiments, the communication apparatus may further include a storage unit 430 (not shown in FIG. 4) configured to store program code and data of the communication apparatus.

For details, refer to the following descriptions.

The transceiver unit 410 is configured to trigger a first procedure.

The processing unit 420 is configured to determine that a trigger condition of the first procedure is satisfied.

The first procedure is used by the network device to determine a location area of the communication apparatus.

In embodiments, the location area of the communication apparatus may be a coverage range of a logical cell.

In embodiments, the location area of the communication apparatus may be a coverage range of a physical cell.

In embodiments, the location area of the communication apparatus may be a coverage range of a satellite beam.

The trigger condition of the first procedure may include at least one of the following:

The communication apparatus switches the location area.

A quantity of times that the communication apparatus switches the location area exceeds a first preset value.

The communication apparatus has displacement, and the displacement exceeds a second preset value.

A time interval since the last time the communication apparatus triggers the first procedure exceeds first time.

The communication apparatus enters an idle state or an inactive state from a connected state.

In embodiments, the first procedure may be as follows:

The transceiver unit 410 sends a first preamble sequence to the network device.

The transceiver unit 410 receives resource configuration information of the network device. The resource configuration information is for configuring a first resource.

The transceiver unit 410 sends first information to the network device over the first resource. The first information includes a first identifier, and the first identifier is for identifying the communication apparatus.

The transceiver unit 410 receives first indication information of the network device. The first indication information indicates the communication apparatus to remain in the idle state or the inactive state.

In embodiments, the first preamble sequence indicates that the first procedure is for determining the location area of the communication apparatus.

In embodiments, the first information further includes a trigger reason, and the trigger reason includes that the trigger condition of the first procedure is triggered.

In embodiments, the first information further includes a camping beam of the communication apparatus.

In embodiments, the first information further includes a camping cell of the communication apparatus.

In embodiments, the first information further includes a camping paging area identifier of the communication apparatus.

In embodiments, the first information further includes a geographical location identifier of the communication apparatus.

In embodiments, the first identifier may be an international mobile subscriber identity (IMSI).

In embodiments, the first identifier may be a system architecture evolved temporary mobile subscriber identity (S-TMSI).

In embodiments, the first identifier may be a 5G system architecture evolved temporary mobile subscriber identity (5G-S-TMSI).

In embodiments, the first identifier may be an inactive radio network temporary identifier (I-RNTI).

In embodiments, the first procedure may be as follows:

The transceiver unit 410 sends second information to the network device. The second information includes a second preamble sequence and a second identifier, and the second identifier is for identifying the communication apparatus.

The transceiver unit receives second indication information of the network device. The second indication information indicates the communication apparatus to remain in the idle state or the inactive state.

In embodiments, the second preamble sequence indicates that the first procedure is for determining the location area of the communication apparatus.

In embodiments, the second information further includes the trigger reason, and the trigger reason includes that the trigger condition of the first procedure is triggered.

In embodiments, the second information further includes a camping beam of the communication apparatus.

In embodiments, the second information further includes a camping cell of the communication apparatus.

In embodiments, the second information further includes a camping paging area identifier of the communication apparatus.

In embodiments, the second information further includes a geographical location identifier of the communication apparatus.

In embodiments, the second identifier may be an international mobile subscriber identity (IMSI).

In embodiments, the second identifier may be a system architecture evolved temporary mobile subscriber identity (S-TMSI).

In embodiments, the second identifier may be a 5G system architecture evolved temporary mobile subscriber identity (5G-S-TMSI).

In embodiments, the second identifier may be an inactive radio network temporary identifier (I-RNTI).

In some embodiments, the communication apparatus 400 may be configured to achieve a function of the network device in any one of the foregoing methods. For example, the communication apparatus 400 may correspond to a network device.

The communication apparatus 400 may be a network device, and performs the operations performed by the network device in the foregoing method embodiments. The transceiver unit 410 may be configured to support the communication apparatus 400 in performing communication, for example, performing sending and/or receiving actions performed by the network device in the foregoing method embodiments. The processing unit 420 may be configured to support the communication apparatus 400 in performing processing actions in the foregoing method embodiments, for example, performing processing actions performed by the network device in the foregoing method embodiments.

In embodiments, the communication apparatus may further include a storage unit 430 (not shown in FIG. 4) configured to store program code and data of the communication apparatus.

For details, refer to the following descriptions.

The transceiver unit 410 is configured to receive information of a first procedure triggered by a terminal device.

The processing unit 420 is configured to determine a location area of the terminal device based on the first procedure.

The first procedure is used by the communication apparatus to determine the location area of the terminal device.

In embodiments, the location area of the terminal device may be a coverage range of a logical cell.

In embodiments, the location area of the terminal device may be a coverage range of a physical cell.

In embodiments, the location area of the terminal device may be a coverage range of a satellite beam.

A trigger condition of the first procedure may include at least one of the following:

The terminal device switches the location area.

A quantity of times that the terminal device switches the location area exceeds a first preset value.

The terminal device has displacement, and the displacement exceeds a second preset value.

A time interval for triggering the first procedure by the terminal device exceeds first time.

The terminal device enters an idle state or an inactive state from a connected state.

In embodiments, the first procedure may be as follows:

The transceiver unit 410 receives a first preamble sequence sent by the terminal device.

The transceiver unit 410 sends resource configuration information to the terminal device. The resource configuration information is for configuring a first resource.

The transceiver unit 410 receives first information sent by a terminal device over the first resource. The first information includes a first identifier, and the first identifier is for identifying the terminal device.

The transceiver unit 410 sends first indication information to the terminal device. The first indication information indicates the terminal device to remain in the idle state or the inactive state.

In embodiments, the first preamble sequence indicates that the first procedure is for determining the location area of the terminal device.

In embodiments, the first information further includes a trigger reason, and the trigger reason includes that the trigger condition of the first procedure is triggered.

In embodiments, the first information further includes a camping beam of the terminal device.

In embodiments, the first information further includes a camping cell of the terminal device.

In embodiments, the first information further includes a camping paging area identifier of the terminal device.

In embodiments, the first information further includes a geographical location identifier of the terminal device.

In embodiments, the first identifier may be an international mobile subscriber identity (IMSI).

In embodiments, the first identifier may be a system architecture evolved temporary mobile subscriber identity (S-TMSI).

In embodiments, the first identifier may be a 5G system architecture evolved temporary mobile subscriber identity (5G-S-TMSI).

In embodiments, the first identifier may be an inactive radio network temporary identifier (I-RNTI).

In embodiments, the first procedure may be as follows:

The transceiver unit 410 receives second information sent by the terminal device. The second information includes a second preamble sequence and a second identifier, and the second identifier is for identifying the terminal device.

The transceiver unit 410 sends second indication information to the terminal device. The second indication information indicates the terminal device to remain in the idle state or the inactive state.

In embodiments, the second preamble sequence indicates that the first procedure is for determining the location area of the terminal device.

In embodiments, the second information further includes the trigger reason, and the trigger reason includes that the trigger condition of the first procedure is triggered.

In embodiments, the second information further includes a camping beam of the terminal device.

In embodiments, the second information further includes a camping cell of the terminal device.

In embodiments, the second information further includes a camping paging area identifier of the terminal device.

In embodiments, the second information further includes a geographical location identifier of the terminal device.

In embodiments, the second identifier may be an international mobile subscriber identity (IMSI).

In embodiments, the second identifier may be a system architecture evolved temporary mobile subscriber identity (S-TMSI).

In embodiments, the second identifier may be a 5G system architecture evolved temporary mobile subscriber identity (5G-S-TMSI).

In embodiments, the second identifier may be an inactive radio network temporary identifier (I-RNTI).

Figure 5:
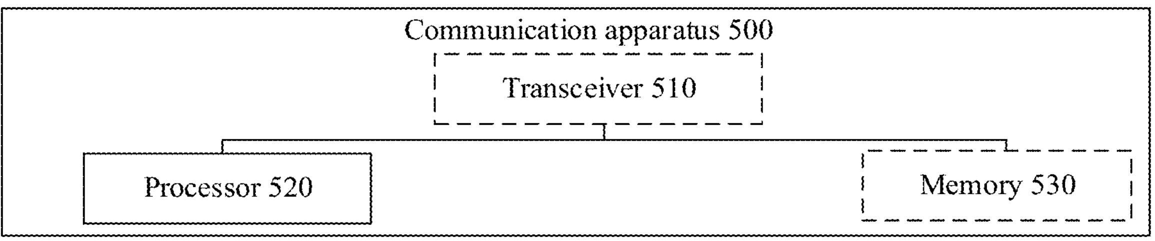
FIG. 5 is a diagram of another example of a communication apparatus according to an embodiment of this application.

FIG. 5 is a diagram of another example of a communication apparatus according to an embodiment of this application. As shown in FIG. 5, the apparatus 500 includes a transceiver 510, a processor 520, and a memory 530. The memory 530 is configured to store instructions. The processor 520 is coupled to the memory 530, and is configured to execute the instructions stored in the memory, to perform the method provided in the foregoing embodiments of this application.

The transceiver 510 in the apparatus 500 may correspond to the transceiver unit 410 in the apparatus 400, and the processor 520 in the communication apparatus 500 may correspond to the processing unit 420 in the communication apparatus 400.

It should be understood that the memory 530 and the processor 520 may be combined into one processing apparatus, and the processor 520 is configured to execute program code stored in the memory 530 to achieve the foregoing functions. During specific embodiment, the memory 530 may alternatively be integrated into the processor 520, or may be independent of the processor 520.

A person of ordinary skill in the art may be aware that, in combination with the examples described in embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the embodiment goes beyond the scope of this application.

It may be clearly understood by a person skilled in the art that, for the purpose of convenient and brief descriptions, for a detailed operating process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual embodiment. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, function units in embodiments of this application may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the operations of the methods described in embodiments of this application. In embodiments, the storage medium is a non-transitory memory, and The foregoing storage medium includes any medium that can store program code, such as a USB flash drive, a removable hard disk, a read-only memory (ROM), a random access memory (RAM), a magnetic disk, or an optical disc.

The foregoing descriptions are merely specific embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for reporting location information, wherein the method is applied to a non-terrestrial network (NTN) system, and the method comprises:

determining, by a first communication apparatus, that a trigger condition of a first procedure is satisfied, wherein the first procedure is used by a network device to determine a location area of the first communication apparatus, wherein the first communication apparatus is a terminal device; and triggering, by the first communication apparatus, the first procedure;

wherein the trigger condition comprises at least one of the following:

the first communication apparatus switches the location area, a quantity of times that the first communication apparatus switches the location area exceeds a first preset value, the first communication apparatus has displacement, and the displacement exceeds a second preset value, a time interval since a last time the first communication apparatus triggers the first procedure exceeds first time, or the first communication apparatus enters an idle state or an inactive state; and wherein the first procedure comprises:

the first communication apparatus sends a first preamble sequence, the first communication apparatus receives resource configuration information, wherein the resource configuration information is for configuring a first resource, the first communication apparatus sends first information over the first resource, wherein the first information comprises a first identifier, and the first identifier is for identifying the first communication apparatus, and the first communication apparatus receives first indication information, wherein the first indication information indicates the first communication apparatus to remain in the idle state or the inactive state; or the first communication apparatus sends second information, wherein the second information comprises a second preamble sequence and a second identifier, and the second identifier is for identifying the first communication apparatus, and the first communication apparatus receives second indication information, wherein the second indication information indicates the first communication apparatus to remain in the idle state or the inactive state.

2. The method according to claim 1, wherein the first information or the second information further comprises at least one of the following:

a trigger reason, wherein the trigger reason comprises that the trigger condition of the first procedure is triggered;

a camping beam of the first communication apparatus;

a camping cell of the first communication apparatus;

a camping paging area identifier of the first communication apparatus; or a geographical location identifier of the first communication apparatus.

3. The method according to claim 1, wherein the first identifier or the second identifier is one of the following:

an international mobile subscriber identity (IMSI);

a system architecture evolved temporary mobile subscriber identity (S-TMSI);

a 5G system architecture evolved temporary mobile subscriber identity (5G-S-TMSI); and an inactive radio network temporary identifier (I-RNTI).

4. The method according to claim 1, wherein the first preamble sequence or the second preamble sequence indicates that the first procedure is for determining the location area.

5. The method according to claim 1, wherein the method further comprises:

receiving, by the first communication apparatus, configuration information, wherein the configuration information is for configuring the trigger condition of the first procedure.

6. The method according to claim 1, wherein the location area comprises:

a coverage range of a logical cell; or a coverage range of a physical cell; or a coverage range of a satellite beam.

7. A method for reporting location information, wherein the method is applied to a non-terrestrial network (NTN) system, and the method comprises:

determining, by a second communication apparatus, a location area of a terminal device based on a first procedure, wherein the first procedure is triggered after the terminal device determines that a trigger condition of the first procedure is satisfied, wherein the second communication apparatus is a network device;

wherein the trigger condition of the first procedure is at least one of the following:

the terminal device switches the location area, a quantity of times that the terminal device switches the location area exceeds a first preset value, the terminal device has displacement, and the displacement exceeds a second preset value, a time interval since a last time the terminal device triggers the first procedure exceeds first time, or the terminal device enters an idle state or an inactive state; and wherein the first procedure comprises:

the second communication apparatus receives a first preamble sequence, the second communication apparatus sends resource configuration information, wherein the resource configuration information is for configuring a first resource, the second communication apparatus receives first information sent over the first resource, wherein the first information comprises a first identifier, and the first identifier is for identifying the terminal device, and the second communication apparatus sends first indication information, wherein the first indication information indicates the terminal device to remain in an idle state or an inactive state; or the second communication apparatus receives second information, wherein the second information comprises a second preamble sequence and a second identifier, and the second identifier is for identifying the terminal device, and the second communication apparatus sends second indication information, wherein the second indication information indicates the terminal device to remain in the idle state or the inactive state; and wherein the second communication apparatus updates the location area of the terminal device.

8. The method according to claim 7, wherein the first information or the second information further comprises at least one of the following:

a trigger reason, wherein the trigger reason comprises that the trigger condition of the first procedure is triggered;

a camping beam of the terminal device;

a camping cell of the terminal device;

a camping paging area identifier of the terminal device; or a geographical location identifier of the terminal device.

9. The method according to claim 7, wherein the first identifier or the second identifier is one of the following:

an international mobile subscriber identity (IMSI);

a system architecture evolved temporary mobile subscriber identity (S-TMSI);

a 5G system architecture evolved temporary mobile subscriber identity (5G-S-TMSI); and an inactive radio network temporary identifier (I-RNTI).

10. The method according to claim 7, wherein the first preamble sequence or the second preamble sequence indicates that the first procedure is for determining the location area.

11. The method according to claim 7, wherein the method further comprises:

sending, by the second communication apparatus, configuration information to the terminal device, wherein the configuration information is for configuring the trigger condition of the first procedure.

12. The method according to claim 7, wherein the location area comprises:

a coverage range of a logical cell; or a coverage range of a physical cell; or a coverage range of a satellite beam.

13. A first communication apparatus for reporting location information, wherein the first communication apparatus being a terminal device comprising:

at least one non-transitory memory, configured to store instructions; and at least one processor, configured to be coupled to the memory, and execute the instructions in the at least one non-transitory memory, to perform operations, comprising:

determining that a trigger condition of a first procedure is satisfied, wherein the first procedure is used by a network device to determine a location area of the first communication apparatus; and triggering, by the first communication apparatus, the first procedure;

wherein the trigger condition comprises at least one of the following:

the first communication apparatus switches the location area, a quantity of times that the first communication apparatus switches the location area exceeds a first preset value, the first communication apparatus has displacement, and the displacement exceeds a second preset value, a time interval since a last time the first communication apparatus triggers the first procedure exceeds first time, or the first communication apparatus enters an idle state or an inactive state; and wherein the first procedure comprises:

the first communication apparatus sends a first preamble sequence, the first communication apparatus receives resource configuration information, wherein the resource configuration information is for configuring a first resource, the first communication apparatus sends first information over the first resource, wherein the first information comprises a first identifier, and the first identifier is for identifying the first communication apparatus, and the first communication apparatus receives first indication information, wherein the first indication information indicates the first communication apparatus to remain in the idle state or the inactive state; or the first communication apparatus sends second information, wherein the second information comprises a second preamble sequence and a second identifier, and the second identifier is for identifying the first communication apparatus, and the first communication apparatus receives second indication information, wherein the second indication information indicates the first communication apparatus to remain in the idle state or the inactive state.

14. The first communication apparatus according to claim 13, wherein the first information or the second information further comprises at least one of the following:

a trigger reason, wherein the trigger reason comprises that the trigger condition of the first procedure is triggered;

a camping beam of the first communication apparatus;

a camping cell of the first communication apparatus;

a camping paging area identifier of the first communication apparatus; or a geographical location identifier of the first communication apparatus.

15. The first communication apparatus according to claim 13, wherein the first identifier or the second identifier is one of the following:

an international mobile subscriber identity (IMSI);

a system architecture evolved temporary mobile subscriber identity (S-TMSI);

a 5G system architecture evolved temporary mobile subscriber identity (5G-S-TMSI); and an inactive radio network temporary identifier (I-RNTI).

16. The first communication apparatus according to claim 13, wherein the first preamble sequence or the second preamble sequence indicates that the first procedure is for determining the location area.

17. The first communication apparatus according to claim 13, wherein the at least one processor is further configured to perform:

receiving, by the first communication apparatus, configuration information, wherein the configuration information is for configuring the trigger condition of the first procedure.

18. The first communication apparatus according to claim 13, wherein the location area comprises:

a coverage range of a logical cell; or a coverage range of a physical cell; or a coverage range of a satellite beam.

19. A second communication apparatus for reporting location information, the second communication apparatus being a network device, comprising:

at least one non-transitory memory, configured to store program instructions and data; and at least one processor, configured to be coupled to the memory, and execute the instructions in the at least one non-transitory memory, to perform:

determining a location area of a terminal device based on a first procedure, wherein the first procedure is triggered after the terminal device determines that a trigger condition of the first procedure is satisfied;

wherein the trigger condition of the first procedure is at least one of the following:

the terminal device switches the location area, a quantity of times that the terminal device switches the location area exceeds a first preset value, the terminal device has displacement, and the displacement exceeds a second preset value, a time interval since a last time the terminal device triggers the first procedure exceeds first time, or the terminal device enters an idle state or an inactive state; and wherein the first procedure comprises:

the second communication apparatus receives a first preamble sequence, the second communication apparatus sends resource configuration information, wherein the resource configuration information is for configuring a first resource, the second communication apparatus receives first information sent over the first resource, wherein the first information comprises a first identifier, and the first identifier is for identifying the terminal device, and the second communication apparatus sends first indication information, wherein the first indication information indicates the terminal device to remain in an idle state or an inactive state; or the second communication apparatus receives second information, wherein the second information comprises a second preamble sequence and a second identifier, and the second identifier is for identifying the terminal device, and the second communication apparatus sends second indication information, wherein the second indication information indicates the terminal device to remain in the idle state or the inactive state; and wherein the second communication apparatus updates the location area of the terminal device.

20. The second communication apparatus according to claim 19, wherein the first information or the second information further comprises at least one of the following:

a trigger reason, wherein the trigger reason comprises that the trigger condition of the first procedure is triggered;

a camping beam of the terminal device;

a camping cell of the terminal device;

a camping paging area identifier of the terminal device; or a geographical location identifier of the terminal device.

* * * * *